United States Patent
Faulkner et al.

(10) Patent No.: US 11,979,188 B2
(45) Date of Patent: May 7, 2024

(54) HYBRID COMMUNICATION

(71) Applicants: Stratospheric Platforms Ltd, Douglas (IM); SURREY SATELLITE TECHNOLOGY LIMITED, Guildford (GB)

(72) Inventors: Andrew Faulkner, Douglas (IM); Richard Holdaway, Douglas (IM); Liam R. Sills, Guildford (GB)

(73) Assignees: Stratospheric Platforms Ltd., Douglas (IM); Surrey Satellite Technology Limited, Guildford (GB)

( * ) Notice: Subject to any disclaimer, the term of this patent is extended or adjusted under 35 U.S.C. 154(b) by 0 days.

(21) Appl. No.: 17/594,089

(22) PCT Filed: Apr. 1, 2020

(86) PCT No.: PCT/GB2020/050873
§ 371 (c)(1),
(2) Date: Oct. 1, 2021

(87) PCT Pub. No.: WO2020/201752
PCT Pub. Date: Oct. 8, 2020

(65) Prior Publication Data
US 2022/0052758 A1 Feb. 17, 2022

(30) Foreign Application Priority Data
Apr. 2, 2019 (GB) .................................. 1904570

(51) Int. Cl.
*H04B 10/118* (2013.01)
*H04B 10/293* (2013.01)
(Continued)

(52) U.S. Cl.
CPC ....... *H04B 10/118* (2013.01); *H04B 10/2939* (2013.01); *H04B 10/294* (2013.01); *H04B 10/299* (2013.01)

(58) Field of Classification Search
CPC .............. H04B 10/118; H04B 10/2939; H04B 10/294; H04B 10/299
(Continued)

(56) References Cited

U.S. PATENT DOCUMENTS

| 5,463,656 A | 10/1995 | Polivka et al. |
| 6,023,605 A | 2/2000 | Sasaki et al. |

(Continued)

FOREIGN PATENT DOCUMENTS

| CN | 104662820 | 5/2015 |
| CN | 106656330 | 5/2017 |

(Continued)

OTHER PUBLICATIONS

Abbas et al; The Role of High-Altitude Platforms (HAPs) in the Global Wireless Connectivity; Nov. 2011; IEEE, pp. 1-15. ( Year: 2011).*

(Continued)

*Primary Examiner* — Amritbir K Sandhu
(74) *Attorney, Agent, or Firm* — Schwegman Lundberg & Woessner, P.A.

(57) ABSTRACT

Apparatus for providing communication between ground-based User Equipment (UE) and at least one core network and a method for providing wireless communication between ground-based User Equipment (UE) and at least one core network are disclosed. The apparatus for providing communication between ground-based User Equipment (UE) and at least one core network comprises a plurality of low earth orbit satellites each comprising at least one satellite-based optical transmitter element and at least one (Continued)

satellite-based optical receiver element for providing at least one optical communication link; and at least one aerial vehicle comprising at least one aerial vehicle based optical transmitter element and at least one aerial vehicle based optical receiver element for providing at least one optical communication link and at least one directional antenna for providing a wireless communication link to a ground-based station and/or mobile UE.

21 Claims, 7 Drawing Sheets

(51) Int. Cl.
    *H04B 10/294*     (2013.01)
    *H04B 10/299*     (2013.01)

(58) Field of Classification Search
    USPC .......................................................... 398/121
    See application file for complete search history.

(56) References Cited

U.S. PATENT DOCUMENTS

| | | | |
|---|---|---|---|
| 6,246,501 B1 | 6/2001 | Dreischer et al. | |
| 6,426,721 B1* | 7/2002 | Obara | H01Q 3/2676 |
| | | | 342/372 |
| 6,529,706 B1 | 3/2003 | Mitchell | |
| 6,606,055 B2 | 8/2003 | Halsema et al. | |
| 6,944,450 B2 | 9/2005 | Cox | |
| 7,426,246 B2* | 9/2008 | Chen | H04N 21/4382 |
| | | | 375/279 |
| 9,404,750 B2 | 8/2016 | Rios | |
| 2002/0173305 A1 | 11/2002 | Forman et al. | |
| 2004/0001720 A1* | 1/2004 | Krill | H04B 7/18508 |
| | | | 398/121 |
| 2009/0028573 A1* | 1/2009 | Krill | H04B 7/18508 |
| | | | 398/121 |
| 2017/0026108 A1* | 1/2017 | Haziza | H04L 7/043 |
| 2017/0085411 A1* | 3/2017 | Noerpel | H04B 7/18504 |
| 2017/0155443 A1* | 6/2017 | Haziza | G01S 5/0263 |
| 2017/0214462 A1 | 7/2017 | Busche et al. | |
| 2018/0019807 A1* | 1/2018 | Hreha | H04B 7/18515 |
| 2018/0254824 A1* | 9/2018 | Speidel | H04B 7/18515 |
| 2019/0028197 A1* | 1/2019 | Turner | H04B 7/195 |
| 2020/0119811 A1* | 4/2020 | Kay | H04B 10/118 |
| 2022/0385372 A1* | 12/2022 | Erkmen | H04B 10/5055 |

FOREIGN PATENT DOCUMENTS

| | | |
|---|---|---|
| EP | 0536921 | 4/1993 |
| WO | WO-0014902 A2 | 3/2000 |
| WO | WO-0159961 A1 | 8/2001 |
| WO | WO-2017204987 A1 | 11/2017 |
| WO | WO-2020201752 A1 | 10/2020 |

OTHER PUBLICATIONS

Farserotu et al; Scalable, Hybrid Optical-RF Wireless Communication System for Broadband and Multimedia Service to Fixed and Mobile Users; 2003; Wireless Personal Communications; pp. 1-13. (Year: 2003).*

Welle et al; A CubeSat-Based Optical Communication Network for Low Earth Orbit; Aug. 2017; The Aerospace Corporation; pp. 1-19. (Year: 2017).*

"International Application No. PCT/GB2020/050873, International Preliminary Report on Patentability dated Oct. 14, 2021", 9 pgs.

"International Application No. PCT/GB2020/050873, International Search Report and Written Opinion dated Sep. 2, 2020", (Sep. 2, 2020), 11 pgs.

"United Kingdom Application GB1904570.7, Search Report dated Apr. 23, 2020", (Apr. 23, 2020), 2 pgs.

Farserotu, J., et al., "Scalable, Hybrid Optical-RF Wireless Communication System for Broadband and Multimedia Service to Fixed and Mobile Users", Wireless Personal Communications 24(2):327-339, (Jan. 1, 2003), 327-339.

Heck, Martijn J.R., "Highly integrated optical phased arrays: photonic integrated circuits for optical beam shaping and beam steering", Nanophotonics, vol. 6, No. 1 (2016), (Jun. 25, 2016), 15 pgs.

Radhakrishnan, Radhika, "Survey of Inter-Satellite Communication for Small Satellite Systems: Physical Layer to Network Layer View", IEEE Communications Surveys & Tutorials 18 (4), 2442-2473, May 9, 2016, (May 9, 2016), 2442-2473.

Roth, Christoph, "OPTEL-μ: Optical Terminal for Small Satellite LEO Applications", Funded jointly by ESA and OEI Opto AG under ARTES programme, (Nov. 10, 2016), 15 pgs.

"Chinese Application 202080027420.2, First Office Action dated Nov. 28, 2023", with English translation, (Nov. 28, 2023), 14 pages.

"European Application 20716903.8, Communication pursuant to Article 94(3) EPC dated Jan. 4, 2024", (Jan. 4, 2024), 6 pgs.

* cited by examiner

HYBRID COMMUNICATION

PRIORITY CLAIM TO RELATED APPLICATIONS

This application is a U.S. national stage filing under 35 U.S.C. § 371 from International Application No. PCT/GB2020/050873, filed on 1 Apr. 2020, and published as WO2020/201752 on 8 Oct. 2020, which claims the benefit under 35 U.S.C. 119 to United Kingdom Application No. GB1904570.7, filed on 2 Apr. 2019, the benefit of priority of each of which is claimed herein, and which applications and publication are hereby incorporated herein by reference in their entirety.

The present invention relates to a method and apparatus for providing wireless communication between ground-based User Equipment (UE) and a core network. In particular, but not exclusively, the present invention relates to a communication network which includes satellites and aerial vehicles such as High Altitude Platforms (HAPs) whereby a communication link is provided between ground-based user equipment and a core network via a combination of HAPs and satellites.

The provision of high bandwidth wireless communications using aerial vehicles has been suggested for many years. An example of an aerial vehicle is a HAP. Various types of aerial vehicles may be examples of HAPs, such as tethered balloons or manned aircraft or unmanned aircraft. HAPs may be deployed in the stratosphere, at an altitude range of 15-22 km. However, while HAPs cover significantly wider areas with line-of-sight (LoS) than terrestrial communication links, they do not currently cover a sufficient area to support worldwide communications.

Worldwide communications using satellites has developed over the years from using Geostationary (GEO) satellites (35000 km altitude) to Low Earth Orbit (LEO) satellites (160-2000 km altitude) to reduce latency and atmospheric and free-space losses. However, communication links between ground-based UE and a cellular network infrastructure (Core Network) via satellites still suffer from capacity and propagation delay limitations, resulting in larger satellites and/or a greater number of satellites to support high power communications in an attempt to overcome signal losses. For example, optical links are not reliable between ground-based communications equipment and satellites due to attenuation of optical signals in the atmosphere by cloud and the effects of scintillation. Supporting cellular devices via satellite communications requires high bandwidth to cover large areas. This requires more satellites with higher power consumption to generate the RF communication links.

In conventional LEO satellite communication systems, in-plane optical inter-satellite communication links are continuous and cross plane links are temporarily broken and remade at extremes of latitude. This breaking of cross plane links results in an incomplete mesh network with edges at high latitude that do not wrap around to form an encompassing network. These non-wrapped edges reduce network routing efficiency and hence increase latency and decrease capacity.

As demand for high data rates increases worldwide, combinations of satellite communication links and HAP communication links have been suggested, however such combinations require increasing satellite and aerial vehicle payloads to support communications equipment capable of providing sufficient bandwidth to cells on the ground. Furthermore, the use of RF and mm-Wave frequencies for satellite-HAP links requires that a plurality of satellites be used to support the bandwidth demanded. Furthermore to date no combinations of the above communication systems are able to provide global point-to-point communication links for high capacity services over cities. Furthermore, none of the above systems are capable of providing direct communication links to user equipment without intermediate ground-based stations or terminals. Requirements of extra ground-based equipment adds significant 'last mile' infrastructure costs to communication networks. A further problem is RF links from satellite constellations to HAPs are not power efficient due to free space losses of RF signals from orbit to the stratosphere. This increases the number of satellites required for a given network capacity which in turn increases network infrastructure costs.

It is an aim of the present invention to at least partly mitigate one or more of the above-mentioned problems.

It is an aim of certain embodiments of the present invention to provide optical communication links between at least one low earth orbit satellite and at least one aerial vehicle.

It is an aim of certain embodiments of the present invention to provide optical communication links between low earth orbit satellites.

It is an aim of certain embodiments of the present invention to provide wireless communication links between at least one HAP and at least one UE.

It is an aim of certain embodiments of the present invention to provide wireless communication links between at least one aerial vehicle and at least one ground-based station.

It is an aim of certain embodiments of the present invention to provide respective optical communication links between aerial vehicles.

It is an aim of certain embodiments of the present invention to provide opto-electronic beam steering of at least one optical communication link.

It is an aim of certain embodiments of the present invention to provide a gimble support for wide angle beam steering of at least one optical communication link.

It is an aim of certain embodiments of the present invention to provide at least one aerial vehicle as a hub for communicating between at least one low earth orbit satellite and at least one further aerial vehicle.

It is an aim of certain embodiments of the present invention to provide at least one optical phased array mounted to an aerial vehicle.

It is an aim of certain embodiments of the present invention to provide at least one laser communication link using an optical phased array mounted to an aerial vehicle.

It is an aim of certain embodiments of the present invention to provide at least one optical phased array that optionally provides a laser communications link, for beam forming and/or beam steering.

It is an aim of certain embodiments of the present invention to provide Wavelength Division Multiplexing (WDM) for optical communication links.

It is an aim of certain embodiments of the present invention to provide WDM within individual optical phased arrays.

It is an aim of certain embodiments of the present invention to provide WDM between separate optical phased arrays for optical communication links.

It is an aim of certain embodiments of the present invention to provide satellites arranged in a constellation in low Earth orbit.

It is an aim of certain embodiments of the present invention to provide Evolved Node B equipment on at least one aerial vehicle.

It is an aim of certain embodiments of the present invention to provide bi-directional high data rate communication links to ground-based UEs.

It is an aim of certain embodiments of the present invention to provide an apparatus and method and communication network whereby a communication link is provided between ground-based user equipment and a core network via a combination of communication links provided by satellites and aerial vehicles in combination.

It is an aim of certain embodiments of the present invention to provide a network of HAPs and a network of satellites to accommodate communications of mobile ground-based UE over a wide area network such as a worldwide network.

It is an aim of certain embodiments of the present invention to provide at least one HAP near satellite orbital crossover points.

According to a first aspect of the present invention there is provided apparatus for providing communication between ground-based User Equipment (UE) and at least one core network, comprising:

a plurality of low earth orbit satellites each comprising at least one satellite-based optical transmitter element and at least one satellite-based optical receiver element for providing at least one optical communication link; and at least one aerial vehicle comprising at least one aerial vehicle based optical transmitter element and at least one aerial-vehicle based optical receiver element for providing at least one optical communication link and at least one directional antenna for providing a wireless communication link to a ground-based station and/or mobile UE.

Aptly, the plurality of low earth orbit satellites each comprise at least one satellite-based optical transceiver element comprising the at least one satellite-based optical transmitter element and the at least one satellite-based optical receiver element.

Aptly, the at least one aerial vehicle comprises at least one aerial vehicle based optical transceiver element comprising the at least one aerial vehicle based optical transmitter element and the at least one aerial vehicle based optical receiver element.

Aptly, each aerial vehicle comprises at least one optical phased array.

Aptly, each aerial vehicle comprises at least one aerial vehicle based optical terminal that each comprise the at least one aerial vehicle based optical transmitter element and the at least one aerial vehicle based optical receiver element.

Aptly, each aerial vehicle comprises at least one aerial vehicle based optical terminal that each comprise the at least one aerial vehicle based optical transceiver.

Aptly, the at least one aerial vehicle based optical terminal comprises at least one aerial vehicle based optical phased array.

Aptly, each low earth orbit satellite comprises at least one satellite-based optical terminal that each comprise the at least one satellite-based optical transmitter element and the at least one satellite-based optical receiver element or at least one satellite-based optical transceiver element.

Aptly, the at least one satellite-based optical terminal comprises at least one optical phased array.

Aptly, at least one aerial vehicle comprises an aerial vehicle based gimble steering member that connects the at least one aerial vehicle based optical transmitter and the at least one aerial vehicle based optical receiver to the aerial vehicle.

Aptly, at least one low earth orbit satellite comprises a satellite-based gimble steering member that connects the at least one satellite-based optical transmitter and the at least one satellite-based optical receiver to the low earth orbit satellite.

Aptly, the at least one wireless communication link is an RF communication link.

Aptly, each optical communication link comprises a Wavelength Division Multiplexed (WDM) point-to-point bi-directional free space optical link.

Aptly, the plurality of low earth orbit satellites comprises a dynamic toroidal mesh of satellites.

Aptly, the toroidal mesh of satellites comprises at least four inter-satellite links.

Aptly, the at least one aerial vehicle comprises a pseudo static reconfigurable honeycomb mesh network of a plurality of High Altitude Platforms (HAPs).

Aptly, the plurality of HAPs includes at least one hub HAP and a plurality of non-hub HAPs; and each hub HAP is arranged for collecting and routing data from the plurality of non-hub HAPs.

Aptly, each hub HAP includes a plurality of optical transceivers and/or a plurality of directional antennas.

Aptly, each aerial vehicle is arranged to communicate with a plurality of user equipment and/or at least one core network via a simple star topology.

Aptly, at least one aerial vehicle is located near orbital plane crossing positions for adjacent satellite orbit planes.

Aptly, each aerial vehicle is arranged to relay inter-plane Intersatellite Links (ISLs).

Aptly, each aerial vehicle is arranged to relay inter-plane Intersatellite Links (ISLs) at high latitude.

According to a second aspect of the present invention there is provided a method for providing wireless communication between ground-based User Equipment (UE) and at least one core network, comprising the steps of:

providing a wireless communication link between at least one ground-based UE and a first aerial vehicle of a plurality of aerial vehicles;

providing an optical communication link between the first aerial vehicle and a first satellite of a plurality of satellites;

providing at least a first inter-satellite optical communication link between the first satellite and a further satellite of the plurality of satellites;

providing a still further optical communication link between the further satellite and a further aerial vehicle of the plurality of aerial vehicles; and providing a final wireless communication link from a final aerial vehicle that comprises the further aerial vehicle or a still further aerial vehicle of the plurality of aerial vehicles, to at least one UE or to a ground-based station in communication with a core network.

Aptly, the method further comprises providing a final optical communication link from the final aerial vehicle that comprises the further aerial vehicle or a still further aerial vehicle of the plurality of aerial vehicles, to at least one optical ground station.

Aptly, the method further comprises communicating between the UE and the core network via said a wireless communication link, the further wireless communication link, the first inter-satellite wireless communication link, the still further wireless communication link and the final wireless communication link.

Aptly, the method further comprises simultaneously providing communication between a plurality of UE and the core network.

Certain embodiments of the present invention provide bi-directional optical communication links between HAPs and Satellites.

Certain embodiments of the present invention provide bi-directional optical communication links between HAPs.

Certain embodiments of the present invention provide at least one aerial base station, reducing communications equipment required on the ground.

Certain embodiments of the present invention provide apparatus for providing wireless (for example RF) communication between one or more ground-based UE and one or more core network whereby multiple satellites and multiple aerial vehicles such as HAPs or the like can operate together in combination to provide wireless communication links connecting geographical areas which could not otherwise be interconnected by a single HAP or single satellite.

Certain embodiments of the present invention provide a communication network including satellites and aerial vehicles which are able to intercommunicate, optionally with optical communication links or the like, whereby a highly meshed network that provides a significant geographical reach is provided.

Certain embodiments of the present invention provide directional optical transceivers that can be optionally mounted on aerial vehicles or satellites and which include a coarse beam steering mechanism and a fine beam steering mechanism. This enables a highly versatile steering system to be provided to provide (for example optical free space) communication links between satellites or between HAPs or between satellites and HAPs. Each optical transceiver may include at least one optical phased array. The transceiver/phased array may be an optical terminal or a functional part of an optical terminal.

Certain embodiments of the present invention provide a method of maintaining inter-satellite communication links at satellite orbit crossover points using at least one HAP.

Certain embodiments of the present invention provide a method of creating a link with satellites in counter rotating orbits or satellites in non-adjacent planes using at least one HAP.

Embodiments of the present invention will now be described hereinafter, by way of example only, with reference to the accompanying drawings in which.

In the drawings like reference numbers refer to like parts.

Figure 1:
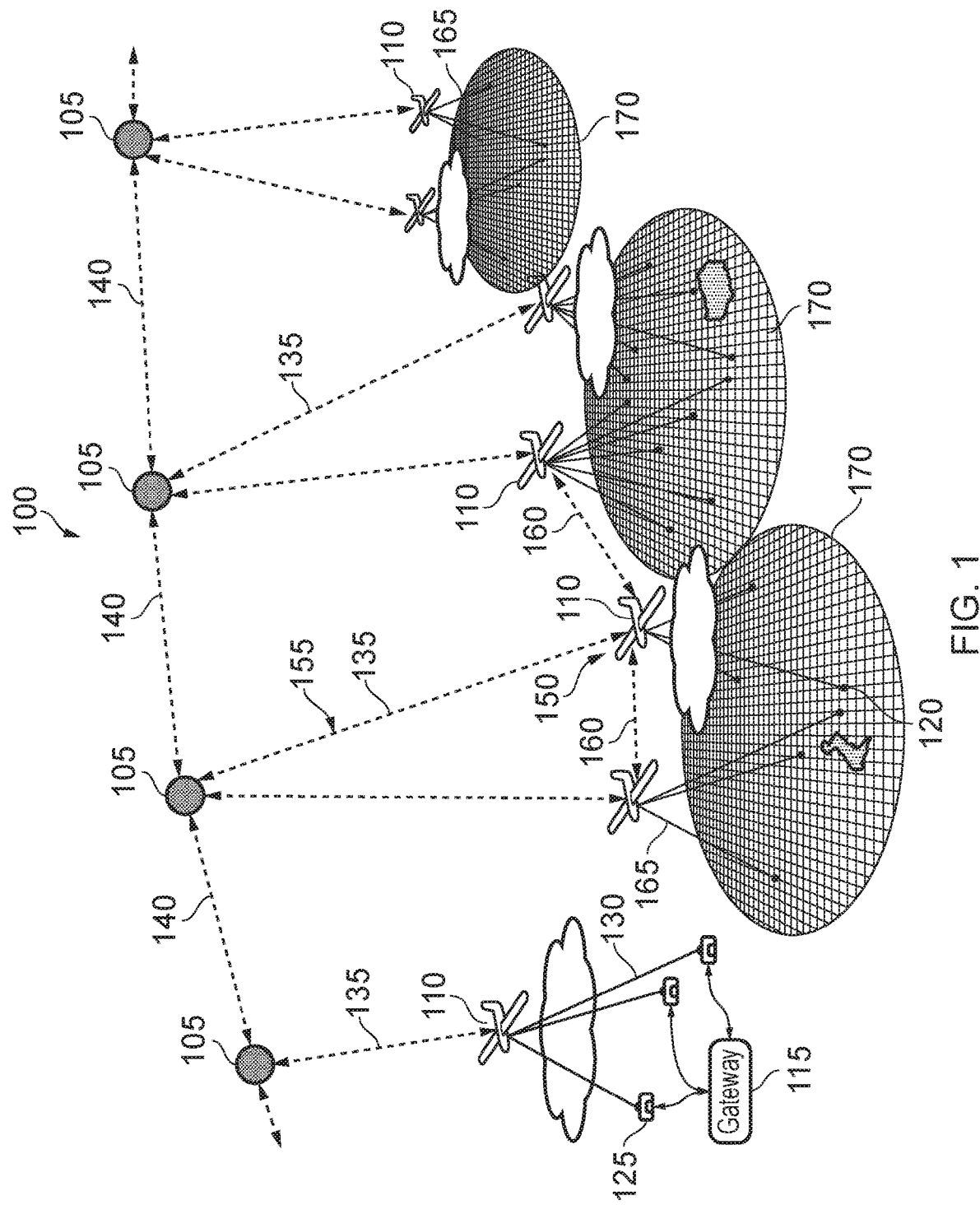
FIG. 1 illustrates a network of satellites and HAPs providing wide area communications between one or more core networks which may be distributed globally and ground-based User Equipment.

FIG. 1 illustrates a communication network 100 including satellites 105 (four shown in FIG. 1) and HAPs 110 for establishing wide area communication links between at least one core network 115 and ground-based users of User Equipment (UE) 120. The wide area communication links can be worldwide communication links or links between nodes distributed across single continents or across single countries or states. In the example embodiment, a communication path exists between the core network 115 and at least one ground-based UE 120. Ground-based stations 125 in connection with the at least one core network 115 provide mm-Wave communication links 130 or other such wireless links to at least one HAP 110. The at least one HAP 110 may comprise optical communication equipment for communicating with at least one satellite 105 via at least one optical communication link 135. Optionally, the at least one optical communication link 135 may be a point-to-point free space optical communication link.

Each satellite 105 (four shown in FIG. 1) may communicate with at least one further satellite 105 via at least one optical communication link 140. The at least one further satellite may communicate with at least one Hub HAP 150 via at least one optical communication link 155. The at least one Hub HAP 150 may communicate with at least one further HAP 110 via at least one inter-HAP optical communication link 160.

The at least one HAP 110 may provide at least one wireless communication link 165 to the at least one ground-based UE 120 within a coverage area 170. The at least one wireless communication link 165 may be a cellular communication link or mm-Wave communication link.

Figure 2:
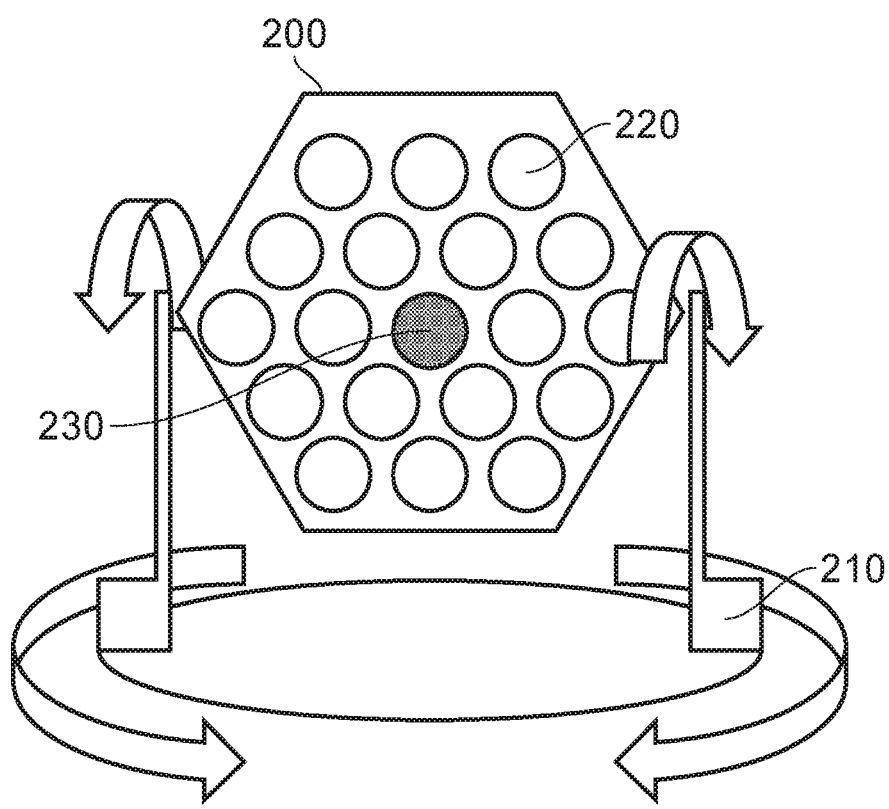
FIG. 2 illustrates an example of a steerable optical communications terminal comprising optical phased array transmit apertures and a focusing receive aperture mounted on a common gimble support mechanism.

FIG. 2 illustrates an example embodiment of a gimble mounted optical terminal 200 comprising at least one optical phased array. The gimble mounted optical phased array may be mounted to an aerial vehicle and/or a satellite. Optionally, multiple optical terminals may be mounted to each HAP and/or satellite. Optionally, the optical terminal may be mounted to an aerial vehicle or satellite without a gimble 210. The optical terminal 200 may comprise at least one optical transceiver. Optionally, at least one optical transceiver may be mounted to each HAP and/or satellite.

In the example embodiment described with respect to FIG. 2, the terminal 200 that includes the optical phased array 200 includes a single central receiving aperture 230, and multiple (eighteen shown in FIG. 2) optical phased arrays with single and/or multiple wavelength transmitting apertures 220. Other numbers and positions for the receiving aperture/s and/or transmitting apertures could of course be used. Optionally, the optical terminal 200 may comprise an array of one or more types of aperture, wherein the types of aperture may comprise receiving apertures 230 and/or single and/or multiple wavelength transmitting apertures 220.

In an alternative embodiment, at least one optical phased array may be mounted to at least one satellite and/or at least one HAP. Optionally, the at least one phased array may be mounted on a gimble member and mounted to at least one satellite and/or at least one HAP. Optionally, the at least one optical phased array may be mounted to at least one satellite and/or at least one HAP with at least one separate receiver. Optionally, the at least one optical phased array may be mounted to at least one satellite and/or at least one HAP with a separate optical transceiver.

The example optical phased array may enable opto-electronic beam steering. Optionally, steering of the optical phased array may be controlled using 2D focal plane array detectors fed by the receiving aperture 230 and centroiding techniques to obtain sub pixel measurements of the relative angular alignment between two terminals/transceivers. Motion of HAPs may be static relative to motion of satellites. Centroiding techniques may comprise measuring angular coordinates of a target optical terminal and determining a pointing vector which may include an appropriate point ahead angle to correctly steer optical beams, thereby achieving closed loop control of optical terminal co-alignment. Opto-electronic beam steering precision may be on the order of micro radians (μad). Steering of the optical terminal 200, and therefore the at least one optical phased array, may comprise wide-angle steering using the gimble support 210. Optionally, steering of the optical phased array may be controlled using the optical receiver 230 and centroiding techniques.

Figure 3:
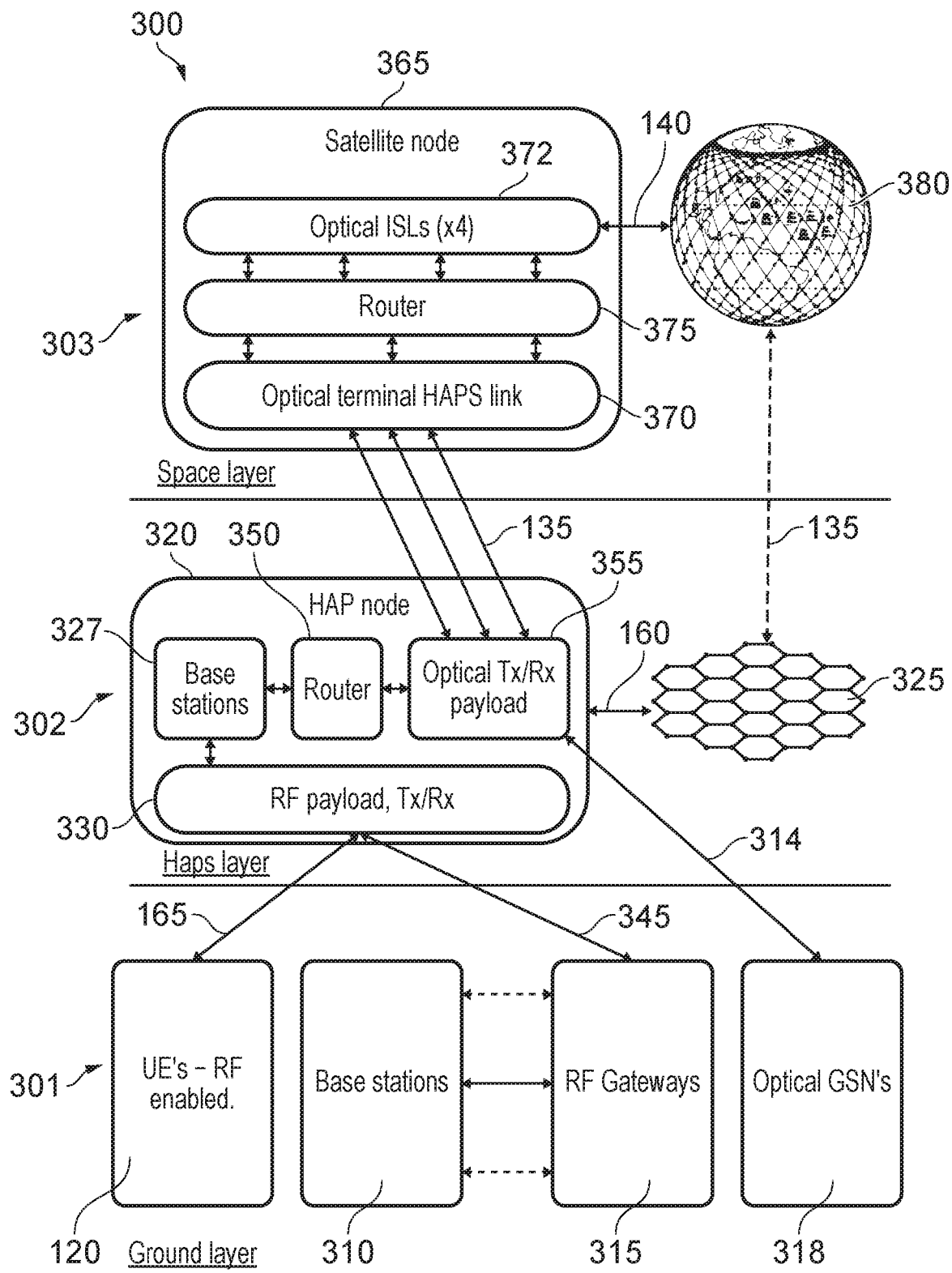
FIG. 3 illustrates a communication network linking ground-based User Equipment and a core network via HAPs and Satellites and identifying components that can be utilised for the network in each layer of the network.

A block diagram shown in FIG. 3 illustrates an example embodiment of a communication network 300 comprising HAPs and satellites. The network comprises three effective layers: a ground layer 301 shown at the bottom of FIG. 3; a HAP layer 302; and a space layer 303.

The ground layer 301 defines terrestrial elements of the network and comprises ground-based UEs 120; a core network 115 (not shown) in connection with at least one ground-based station, further comprising at least one ground-based base station 310 and/or at least one wide bandwidth gateway 315; and/or at least one optical ground station (GSN) 318. The optical GSN 318 may be in connection with at least one core network via ground based fibre links. Optionally, the at least one ground-based base station 310 may comprise at least one eNodeB and/or at least one core network gateway 115. Optionally, terrestrial elements of the network may already exist and certain embodiments of the present invention can thus be "retrofitted" to extant networks.

The HAP layer 302 defines aerial, such as stratospheric, domain elements of the network and comprises at least one HAP node 320 associated with a respective HAP 110 which may be in connection with at least one further HAP. Optionally, the HAP node 320 may be in connection with a honeycomb mesh network 325 of HAPs 110. Optionally, other types of network topology may be used for the network of HAPs. Inter-HAP connections 160 may comprise optical free space or RF communication links.

The HAP node 320 comprises a payload 330 comprising RF (or other such wireless) communication equipment for providing at least one communication link 165 to at least one ground-based UE 120 and/or at least one communication link 345 to at least one mm-Wave gateway 315. The wireless communication link 165 between HAP and UE may comprise RF and/or mm-Wave communication links. Payload 330 may further comprise at least one directional antenna.

The HAP node 320 may further comprise at least one base station 327 in connection with wireless communication equipment of payload 330. Optionally, the HAP node 320 may further comprise a router 350 for managing incoming and outgoing communication signals from the various types of communication links. The HAP node 320 may comprise an optical terminal 355 that may comprise laser base band equipment and at least one optical phased array. Weather permitting, at least one HAP node 320 may also form direct free space optical communication links with the at least one optical ground stations (GSN) 318. Optionally, the optical terminal 355 may further comprise an optical receiver. Alternatively, the optical receiver may be provided separate to the optical terminal 355. The example optical terminal may implement wavelength division multiplexing (WDM). An optical phased array may enable WDM using multiple co-aligned single wavelength transmitting apertures. An optical phased array (OPA) may enable WDM by transmitting multiple wavelengths of light through a single optical phased array. WDM may be implemented using a combination of multiple OPA apertures and/or multiple wavelengths from single aperture. Components of a HAP node 320 may be interconnected by fibre, and/or wired and/or wireless links.

A space layer 303 may comprise at least one satellite node 365 provided by a respective satellite 105 that may comprise at least one satellite-HAP optical terminal 370 for providing bi-directional satellite-HAP optical communication links 135 and one optical terminal 372 for providing bi-directional inter-satellite optical communication links 140 and a router 375. Optionally, one optical terminal may be provided for both satellite-HAP and inter-satellite bidirectional optical communication links. Optionally, the satellite node 365 may establish inter-satellite communication links 140 with at least one further satellite, wherein inter-satellite communication links may comprise optical communication links. Optionally, inter-satellite communications between further satellites may form a network 380 of satellites 105. An example satellite network structure may comprise a toroidal mesh network. Optionally, further HAP nodes of the satellite network 380 may establish optical communication links with further HAP nodes in a honeycomb mesh network or other network topology 325.

At least one of the optical terminals 370, 372 of the satellite node 365 may comprise laser base band equipment and at least one optical phased array. The satellite-satellite optical terminal 372 may establish a plurality of bi-directional inter-satellite communication links 140. The satellite-HAP optical terminal 370 may establish at least one and optionally a plurality of bi-directional optical communication links 135 with at least one HAP node 320. The router 375 of a satellite node may be used to switch data via an optimal route through the network. Optionally, a method of routing connections may comprise using Dijkstra shortest-path algorithms applied to the whole ground, air and space-based network or the like.

Figure 4A:
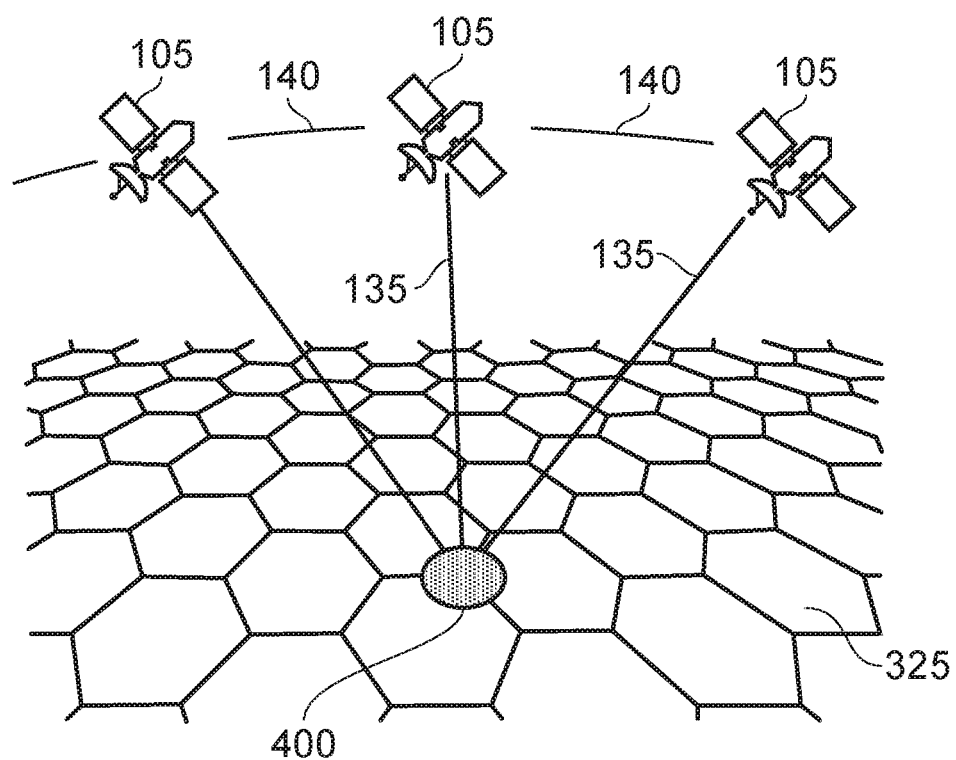
FIG. 4a illustrates communication links between low earth orbit satellites and a Hub HAP in connection with a honeycomb mesh network of HAPs.

FIG. 4a, illustrates satellites 105 (three shown in FIG. 4a) in connection with a HAP node 320. At least one satellite 105 may communicate with a further satellite 105 via at least one inter-satellite communication link (ISL) 140 and/or at least one HAP node 320 via at least one optical communication link 135. Optionally, a HAP node 320 may act as a Hub HAP 400. The at least one Hub HAP node 400 may communicate with a network of HAPs that form part of a network 325. The Hub HAP 400 may communicate with multiple satellite nodes 105 simultaneously. Inter-HAP connections of the HAP network may comprise at least one optical communication link. Optionally, the HAP network may be reconfigurable.

Figure 4B:
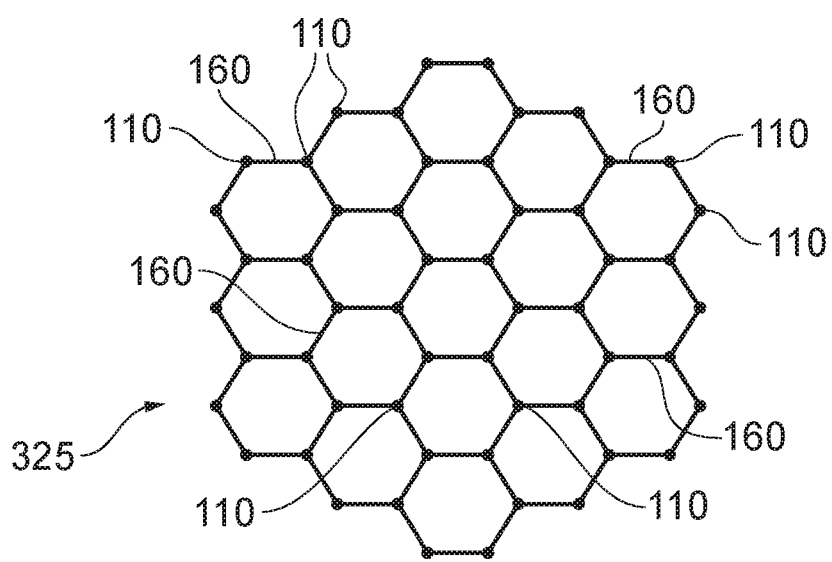
FIG. 4b illustrates a honeycomb mesh network of HAPs.

An illustration of an example HAP honeycomb mesh network 325, as viewed from above, is shown in FIG. 4b. Optionally, a HAP network may form alternative structures. The HAP honeycomb mesh network 325 comprises at least one HAP 110 interconnected with at least one further HAP 110 by at least one communication link 160. Optionally, the at least one communication link 160 may comprise at least one optical communication link. Optionally, at least one HAP 110 of the honeycomb mesh network 325 is a Hub HAP 400.

Figure 4C:
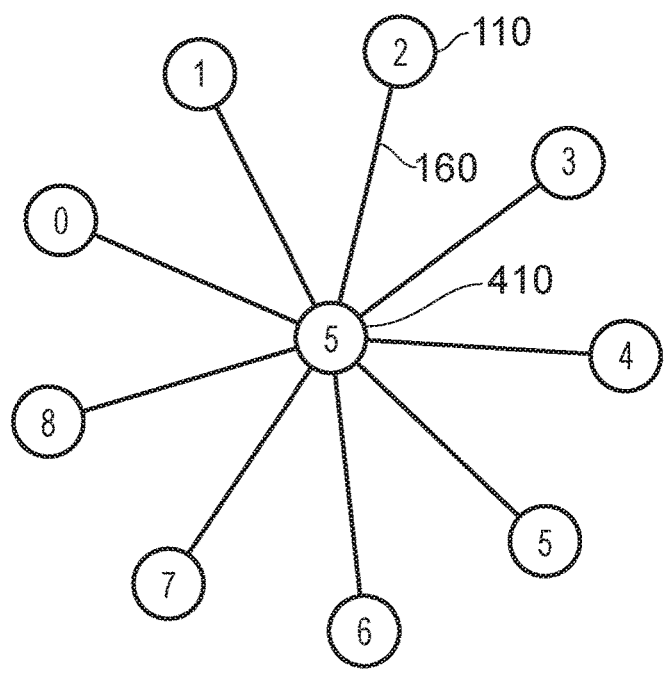
FIG. 4c illustrates a star arrangement of UEs, gateways or other cellular network equipment around a central Hub HAP.
Figure 4D:
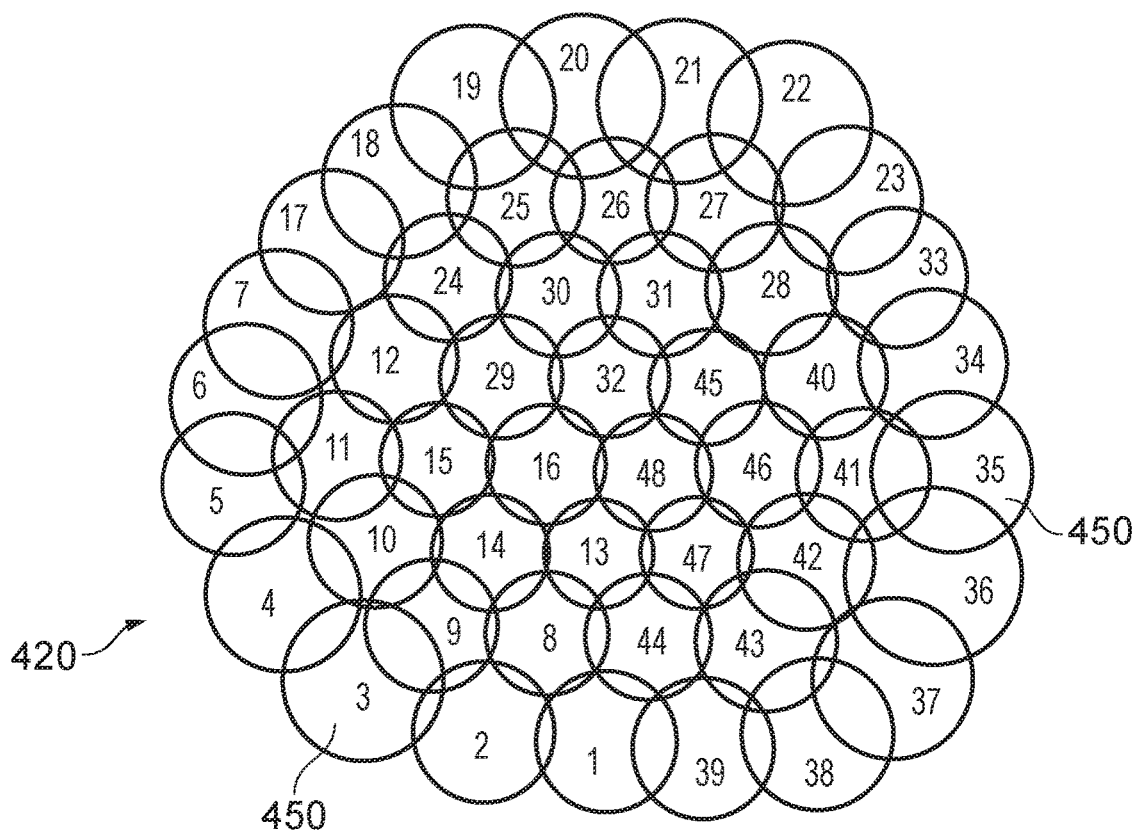
FIG. 4d illustrates RF cells covered by a single HAP payload linking to ground based equipment in a star topology.

FIG. 4c illustrates a star topology of the interconnect formed by a single HAP 410 and various ground-based UE and core networks via RF wireless links from at least one directional antenna mounted on the HAP 410. The at least one HAP illustrated in FIG. 4c may provide wireless communication to an overall service area 420, illustrated in FIG. 4d. The coverage area 420 associated with the service area may be divided into cells 450 (forty-eight shown in FIG. 4d). Optionally, the size and number of cells covered may vary according to user demands.

Figure 5:
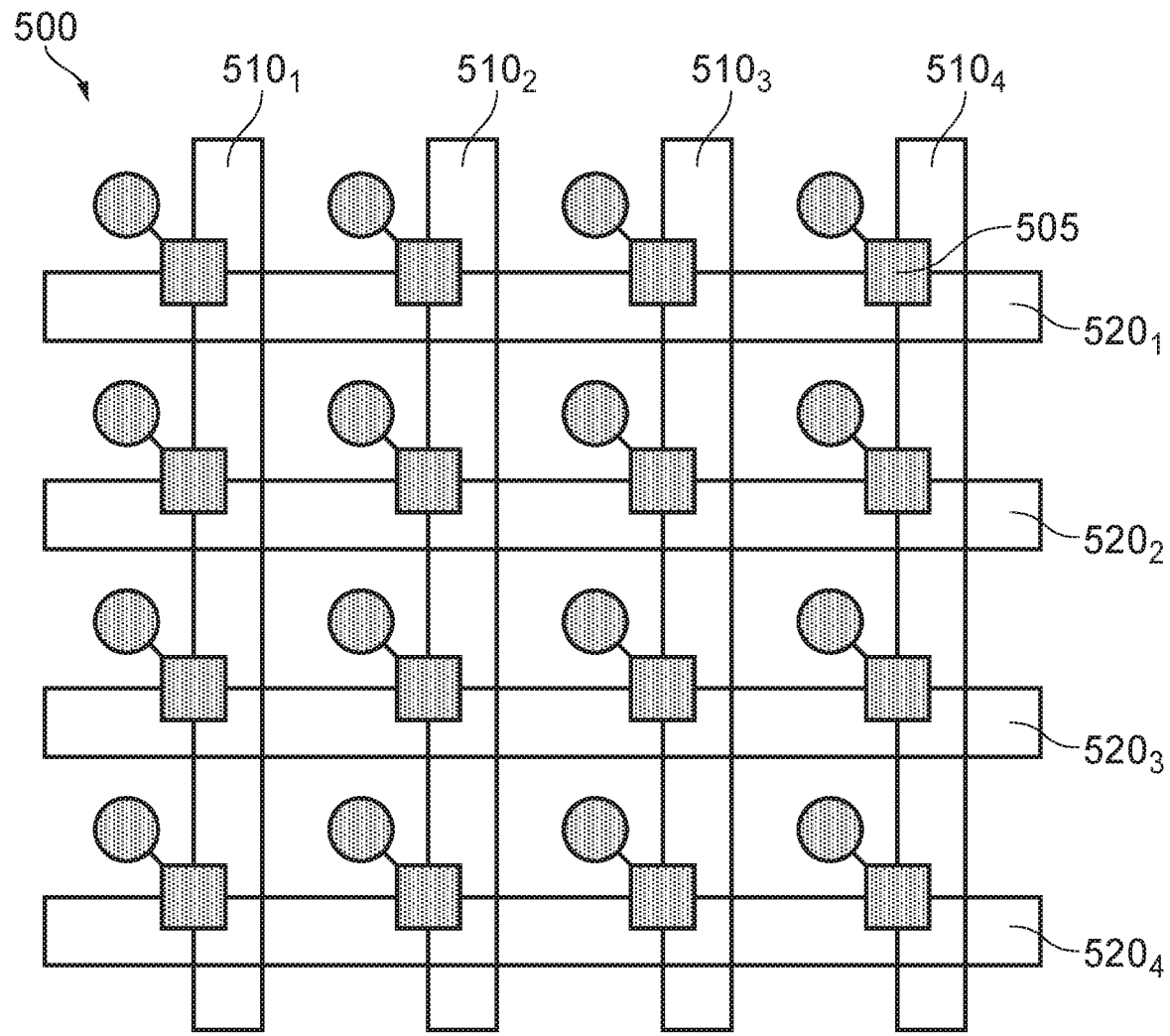
FIG. 5 illustrates a 2D projection of satellites organised into a toroidal mesh network, wherein satellites are linked within and across orbital planes.

FIG. 5 illustrates a 2D projection of an example array 500 of satellites 105 arranged into orbital planes. The 2D projection shows at least one satellite 505 arranged into vertical loops representing orbital planes 510 and horizontal loops 520 (four shown) representing cross orbital plane links. Optionally, satellite planes and/or satellites may be added to and/or removed from an array as required. The array may form a constellation. Example satellite constellations may include a toroidal constellation or a Ballard rosette constellation or a Walker constellation or the like.

Figure 6:
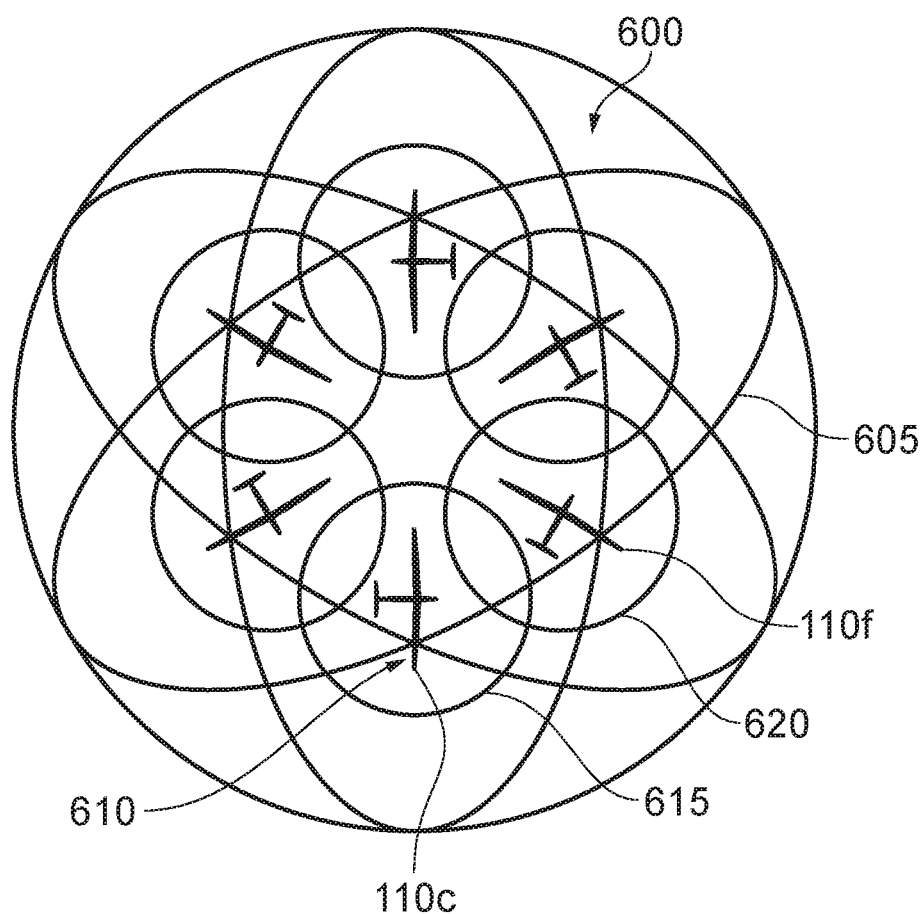
FIG. 6 illustrates orbits of satellites around the earth as viewed from above the poles wherein loss of communication links at orbital crossover points are supported by HAPs.

An example projection of satellite orbits 600 and HAPs 110 is illustrated in FIG. 6. The perspective illustrated in FIG. 6 is from above one of the poles of the Earth. At least one satellite may be organised into at least one orbital plane 605. In the example embodiment, at least one orbital plane cross point 610, in-plane inter-satellite communication links are maintained however cross-plane inter-satellite communication links are broken and remade. To overcome the adverse problems associated with breaking cross-plane inter-satellite communication links at least one HAP 110$_c$ may be provided near at least one orbital cross point 610 to relay at least one inter-satellite communication link during at least one orbital cross over period. Optionally, the at least one HAP 110$_c$ may further relay the at least one inter-satellite communication link for a period of time before and/or after the at least orbital crossover period. As the position of an orbital cross point changes with the earth's rotation, responsibility of relaying at least one inter-satellite communication link may shift from a first HAP 110$_c$ to at least one further HAP 110$f$ because the Earth's rotation, and therefore HAP motion, is much greater than orbital precession of satellites. For example, as an orbital cross point 610 changes position and falls out of range of a HAP supporting/access area 615 into at least one further HAP supporting/access area 620, at least one inter-satellite communication link associated with the cross point can be relayed by at least one further HAP 110$f$ in the further supporting area 620. The adjacent HAP supporting/access areas must have overlap to maintain the network links This method retains the fully connected topology of the satellite network.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A system for providing communication between ground-based User Equipment (UE) and at least one core network by way of a plurality of low earth orbit satellites each comprising at least one optical transmitter and at least one optical receiver for providing at least one optical communication link, comprising:
    at least one aerial vehicle that is a High Altitude Platform (HAP) comprising:
        at least one optical transmitter and at least one optical receiver for providing at least one optical communication link;
        at least one directional antenna for providing a wireless communication link to a ground-based station and/or mobile UE; and
        at least one optical phased array;
        wherein the HAP is configured to maintain itself at a location near an orbital plane crossing position for adjacent satellite orbit planes to relay at least one inter-satellite communication link during at least one orbital cross over period.

2. The system as claimed in claim 1, wherein the plurality of low earth orbit satellites each comprise at least one optical transceiver comprising the at least one optical transmitter and the at least one optical receiver.

3. The system as claimed in claim 1, further comprising: the at least one HAP comprises at least one optical transceiver comprising the at least one optical transmitter and the at least one optical receiver.

4. The system as claimed in claim 1, further comprising: each HAP comprises at least one HAP based optical terminal that each comprise the at least one optical transmitter and the at least one optical receiver.

5. The system as claimed in claim 4, further comprising: the at least one HAP based optical terminal comprises at least one HAP based optical phased array.

6. The system as claimed in claim 5, further comprising: the at least one satellite-based optical terminal comprises at least one optical phased array.

7. The system as claimed in claim 1, further comprising: each low earth orbit satellite comprises at least one satellite-based optical terminal that each comprise the at least one optical transmitter and the at least one optical receiver or at least one transceiver.

8. The system as claimed in claim 1, further comprising: at least one HAP comprises an aerial vehicle based gimble steering member that connects the at least one optical transmitter and the at least one optical receiver to the HAP.

9. The system as claimed in claim 1, further comprising:
at least one low earth orbit satellite comprises a satellite-based gimble steering member that connects the at least one optical transmitter and the at least one optical receiver to the low earth orbit satellite.

10. The system as claimed in claim 1, further comprising:
each optical communication link comprises a Wavelength Division Multiplexed (WDM) point-to-point bi-directional free space optical link.

11. The system as claimed in claim 1 wherein:
the plurality of low earth orbit satellites comprises a dynamic toroidal mesh of satellites.

12. The system as claimed in claim 11, further comprising:
the dynamic toroidal mesh of satellites comprises at least four inter-satellite links.

13. The system as claimed in claim 12, further comprising:
the plurality of HAPs includes at least one hub HAP and a plurality of non-hub HAPs; and
each hub HAP is arranged for collecting and routing data from the plurality of non-hub HAPs.

14. The system as claimed in claim 1, further comprising:
a plurality of HAPs, including the at least one HAP, configured as a pseudo static reconfigurable honeycomb mesh network of HAPs.

15. The system as claimed in claim 1, further comprising:
the at least one HAP is arranged to communicate with a plurality of user equipment and/or at least one core network via a simple star topology.

16. The system as claimed in claim 1, further comprising:
each HAP is arranged to relay inter-plane Intersatellite Links (ISLs).

17. The system as claimed in claim 16, further comprising:
each HAP is arranged to relay inter-plane Intersatellite Links (ISLs) at high latitude.

18. The system claimed in claim 1, wherein:
the at least one HAP is further configured to relay the at least one inter-satellite communication link for a period of time before and/or after the at least one orbital cross over period.

19. A method for providing wireless communication between ground-based User Equipment (UE) and at least one core network, comprising the steps of:
providing a wireless communication link between at least one ground-based UE and a first High Altitude Platform (HAP) of a plurality of HAPs;
providing an optical communication link between the first HAP and a first satellite of a plurality of satellites;
providing at least a first inter-satellite optical communication link between the first satellite and a further satellite of the plurality of satellites;
providing a still further optical communication link between the further satellite and a further HAP of the plurality of aerial vehicles; and
providing a final wireless communication link from a final HAP that comprises the further HAP or a still further HAP of the plurality of HAPs to at least one UE or to a ground-based station in communication with a core network,
wherein each aerial vehicle comprises at least one optical phased array, wherein
at least one HAP of the first, further and still further HAPs is configured to maintain itself at a location near an orbital plane crossing position for adjacent satellite orbit planes to relay at least one inter-satellite communication link during at least one orbital cross over period.

20. The method as claimed in claim 19, wherein:
the at least one HAP is located near the orbital plane crossing position for adjacent satellite orbit planes to relay at least one inter-satellite communication link during at least one orbital cross over period.

21. The method as claimed in claim 20, wherein:
the at least one HAP further relays the at least one inter-satellite communication link for a period of time before and/or after the at least one orbital cross over period.

* * * * *